(12) United States Patent  (10) Patent No.: US 7,446,303 B2
Maniam et al.  (45) Date of Patent: Nov. 4, 2008

(54) AMBIENT LIGHT SENSING USING A COLOR SENSOR

(75) Inventors: Selvan Maniam, Penang (MY); Kean Loo Keh, Penang (MY); Farn Hin Chen, Perak (MY)

(73) Assignee: Avago Technologies ECBU IP (Singapore) Pte. Ltd, Singapore (SG)

( * ) Notice: Subject to any disclaimer, the term of this patent is extended or adjusted under 35 U.S.C. 154(b) by 0 days.

(21) Appl. No.: 11/669,360

(22) Filed: Jan. 31, 2007

(65) Prior Publication Data

US 2008/0179497 A1 Jul. 31, 2008

(51) Int. Cl.
*G01J 3/51* (2006.01)

(52) U.S. Cl. .................. 250/226; 250/214 AL
(58) Field of Classification Search ............. 250/226, 250/214 AL, 214 B; 345/102
See application file for complete search history.

(56) References Cited

U.S. PATENT DOCUMENTS

| | | | | |
|---|---|---|---|---|
| 4,887,121 | A * | 12/1989 | Pritchard | ............. 396/225 |
| 5,596,428 | A | 1/1997 | Tytgat et al. | |
| 6,320,668 | B1 | 11/2001 | Kim | |
| 2003/0160877 | A1 | 8/2003 | Sumida | |
| 2004/0105264 | A1* | 6/2004 | Spero | ............. 362/276 |
| 2005/0083293 | A1* | 4/2005 | Dixon | ............. 345/102 |
| 2005/0185065 | A1* | 8/2005 | Goris et al. | ............. 348/223.1 |
| 2006/0146330 | A1 | 7/2006 | Maniam | |
| 2007/0103934 | A1* | 5/2007 | Keh et al. | ............. 362/612 |

OTHER PUBLICATIONS

Ng Joh Joh, Lim Khee Boon, Kwong Yin Leong, "Understanding Avago Technologies RGB Color Sensors", Oct. 3, 2006, p. 1-14.
Javier Hernandez-Andres, Raymond L. Lee, Jr., and Javier Romero, "Calculating correlated color temperatures across the entire gamut of daylight and skylight chromaticities", Sep. 20, 1999, vol. 38, No. 27, p. 5703-5709.
Sharma, G. and Trussell, J.H., "Digital Color Imaging", Jul. 1997, IEEE Transactions On Image Processing vol. 6, No. 7.
Vora, P.L. and Trussell, J.H., "Mathematical Methods for Design of Color Scanning Filters", Feb. 1997, IEEE Transactions On Image Processing, Vo. 6, No. 2.

* cited by examiner

*Primary Examiner*—John R Lee

(57) ABSTRACT

An ambient light sensor (ALS) system is described. The ALS system includes a polychromatic color sensor, an analog-to-digital converter (ADC), and a digital processor. The polychromatic color sensor generates a plurality of analog signals from a corresponding plurality of color channels based on a detected ambient light signal. The ADC is coupled to the polychromatic color sensor. The ADC converts the plurality of analog signals to a plurality of digital signals. The digital processor is coupled to the ADC. The digital processor generates a processed light signal. The processed light signal describes a characteristic of the detected ambient light signal. Embodiments of the ALS system provide a more comprehensive characterization of the ambient light, and facilitate control of a device based on the characterization of the ambient light.

20 Claims, 8 Drawing Sheets

AMBIENT LIGHT SENSING USING A COLOR SENSOR

BACKGROUND OF THE INVENTION

An ambient light sensor (ALS) senses the brightness of ambient light. There are many applications for ambient light sensors. Some mobile devices such as cellular telephones and personal digital assistants (PDAs) use ambient light sensors to detect ambient light conditions and adjust the screen output (i.e., the brightness of the screen) based on the ambient light information. Controlling the screen output based on the ambient light conditions facilitates power savings and, hence, extended battery life because the mobile devices may decrease the screen output (i.e., dim the screen) when ambient light levels are relatively low.

Conventional ALS systems typically use a single, filtered photodiode. FIG. 1 depicts a schematic diagram of one embodiment of a conventional ambient light sensor system 10. The conventional ALS system 10 includes a light source 12, an illuminated object 14, a monochromatic light sensor 16, an analog-to-digital converter (ADC) 18, and a digital processor 20. Light from the light source 12 is incident on the illuminated object 14, and the reflected light from the illuminated object 14 is detected by the monochromatic light sensor 16. In general, the monochromatic light sensor 16 generates an electrical signal such as a voltage signal that is dependent on the intensity of the detected light. The monochromatic light sensor 16 then sends the generated electrical signal via an analog line 22 to the ADC 18, which converts the analog electrical signal to a corresponding digital signal. The ADC 18 then sends the corresponding digital signal to the digital processor 20 via a digital line 24. The digital processor 20 uses the digital signal to generate a signal representative of the ambient brightness 26.

Using a single photodiode results in a single input channel. Although a single input channel is sufficient to approximate ambient brightness, other information regarding the ambient lighting cannot be obtained. For example, conventional single-photodiode ALS systems cannot detect color, correlated color temperature, or light source type. This limits the usefulness of conventional ALS systems to only brightness compensation.

SUMMARY OF THE INVENTION

Embodiments of a system are described. In one embodiment, the system is an ambient light sensor (ALS) system. The ALS system includes a polychromatic color sensor, an analog-to-digital converter (ADC), and a digital processor. The polychromatic color sensor generates a plurality of analog signals from a corresponding plurality of color channels based on a detected ambient light signal. The ADC is coupled to the polychromatic color sensor. The ADC converts the plurality of analog signals to a plurality of digital signals. The digital processor is coupled to the ADC. The digital processor generates a processed light signal. The processed light signal describes a characteristic of the detected ambient light signal. Other embodiments of the system are also described.

Embodiments of an apparatus are also described. In one embodiment, the apparatus is configured to monitor ambient light. The apparatus includes means for receiving a light signal from an ambient light source, means for generating a plurality of sensor signals from the received light signal, and means for generating a processed light signal. In some embodiments, the plurality of sensor signals corresponds to a plurality of color channels. In some embodiments, the processed light signal describes a characteristic of the received light signal. Other embodiments of the apparatus are also described.

Embodiments of a method are also described. In one embodiment, the method is a method for sensing ambient light conditions. The method includes receiving a light signal from an ambient light source, generating a plurality of sensor signals based on the received light signal, and generating a processed light signal based on at least one of the sensor signals. In some embodiments, each of the plurality of sensor signals is associated with a corresponding one of a plurality of color channels. In some embodiments, the processed light signal describes a characteristic of the received light signal. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
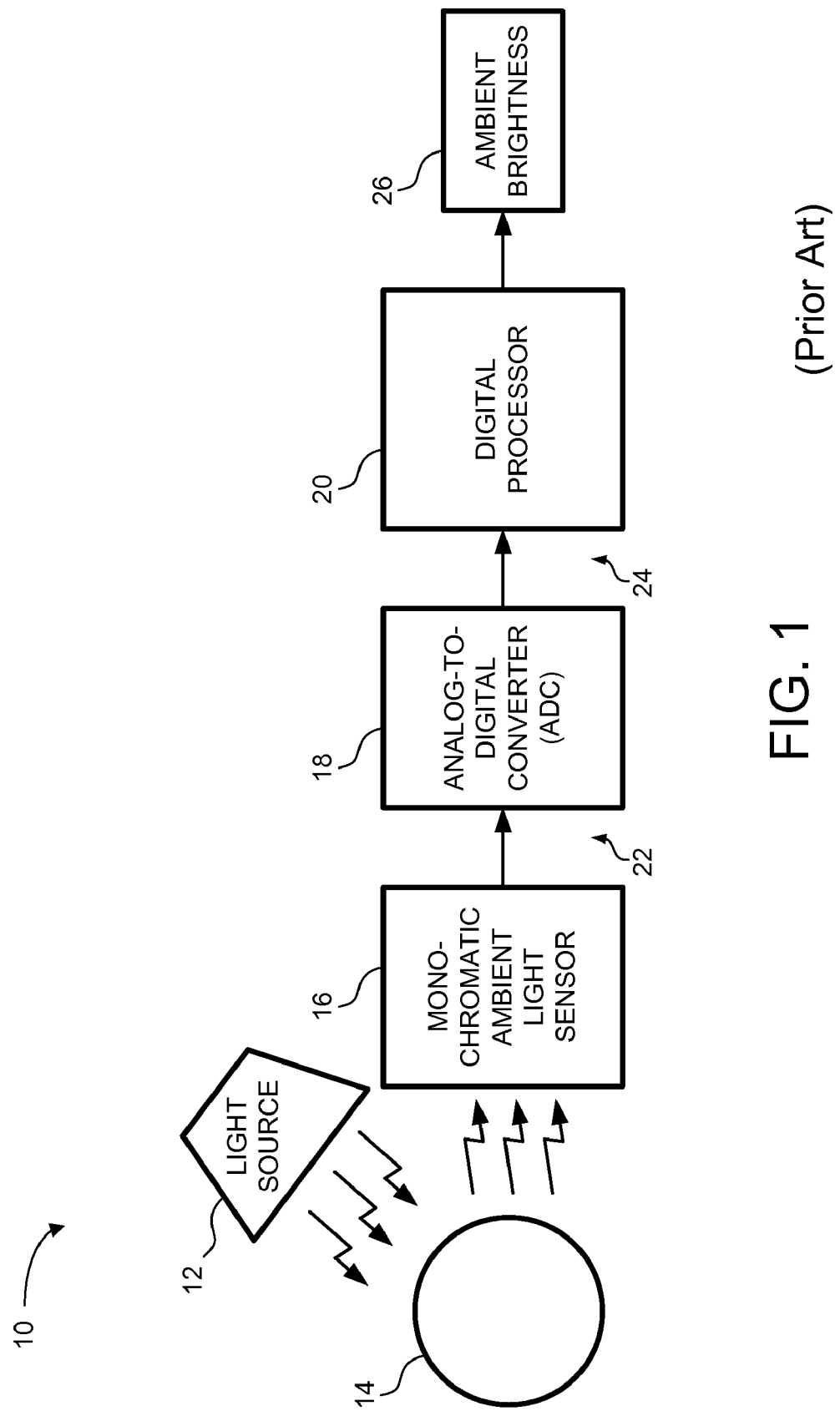
FIG. 1 depicts a schematic diagram of one embodiment of a conventional ambient light sensor system.
Figure 2:
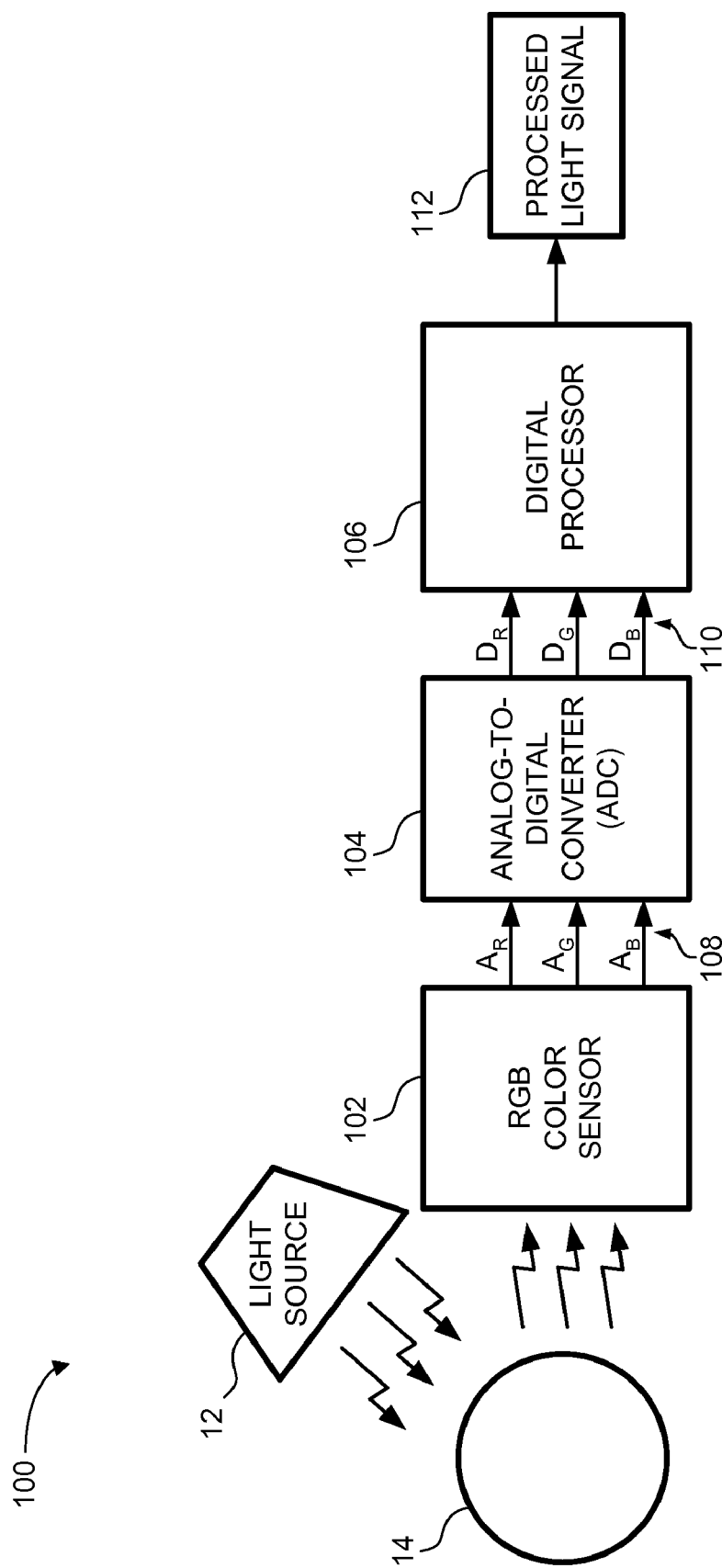
FIG. 2 depicts a schematic diagram of one embodiment of an ambient light sensor system which uses polychromatic color sensor.

FIG. 2 depicts a schematic diagram of one embodiment of an ambient light sensor (ALS) system 100 which uses polychromatic color sensor 102. More specifically, the depicted ALS system 100 includes an ambient light source 12, an illuminated object 14, the polychromatic color sensor 102, an analog-to-digital converter (ADC) 104, and a digital processor 106. In general, the polychromatic color sensor 102 receives a light signal either directly or indirectly from the ambient light source and generates a plurality of analog sensor signals. The polychromatic color sensor 102 sends the analog signals to the ADC 104 via one or more analog lines 108. The ADC 104 converts the analog signals to digital signals and sends the digital signals to the digital processor 106 via one or more digital lines 110. The digital processor 106 processes the digital signals and generates a processed light signal 112. Different types of processed light signals 112 are described in more detail below.

In some embodiments, the ambient light source 12 may be any type of light source, including a light emitting diode (LED), a fluorescent lamp, an incandescent lamp, a high-intensity discharge lamp, the sun, or another type of light source which produces ambient light. The ambient light may be directly incident on the polychromatic color sensor 102, or the ambient light may be reflected off of an illuminated object 14. In other words, the polychromatic color sensor 102 may detect a direct light signal from the light source 12 or an indirect (i.e.,) light signal from the light source 12.

There are different types of polychromatic color sensors 102, three of which are described herein. However, some embodiments of the ALS system 100 may implement other types of polychromatic color sensors 102. The three types of polychromatic color sensors 102 discussed herein include light-to-photocurrent color sensors, light-to-analog voltage color sensors, and light-to-digital color sensors. As the designations imply, the different types of polychromatic color sensors 102 convert light to some type of electrical signal, which is generally referred to herein as a sensor signal. Some exemplary sensor signals include current signals, analog voltage signals, and digital voltage signals. In some embodiments, the type of polychromatic color sensor 102 depends on how many components are provided on a single integrated circuit (IC) or printed circuit board (PCB). One specific type of light-to-analog voltage color sensor 102 is a red, green, blue (RGB) color sensor. One embodiment of the RGB color sensor 102 generates analog voltage signals corresponding to each of the red, green, and blue color channels. Additional details of exemplary light-to-analog voltage color sensors 102 are shown and describe in more detail with reference to FIGS. 3 and 4.

As described above, the ADC 104 converts analog voltage signals to digital voltage signals. In an ALS system 100 which uses an RGB color sensor 102, the analog voltage signals include a red analog voltage signal, $A_R$, a green analog voltage signal, $A_G$, and a blue analog voltage signal, $A_B$. Other embodiments of the ALS system 100 may include a different number of color channels. For example, one embodiment of the ALS system 100 may use four-channel color sensor. Whether there are three color channels, or a different number of color channels, the ADC 104 converts each of the analog voltage signals to a corresponding digital voltage signal. For example, the red analog voltage signal, $A_R$, is converted to a red digital voltage signal, $D_R$; the green analog voltage signal, $A_G$, is converted to a green digital voltage signal, $D_G$; and the blue analog voltage signal, $A_B$, is converted to a blue digital voltage signal, $D_B$.

The digital processor 106 processes one or more of the digital voltage signals to generate a processed light signal 112. The processed light signal 112 describes one or more characteristics of the ambient light signal detected by the polychromatic color sensor 102. For example, the processed light signal 112 may be a brightness signal, a color signal, a correlated color temperature signal, a light source identifier, or another type of signal to describe a characteristic of the ambient light or the ambient light source 12. Examples of how the digital processor 106 might generate each of these signals are provided below with reference to FIGS. 5A to 5E.

Figure 3:
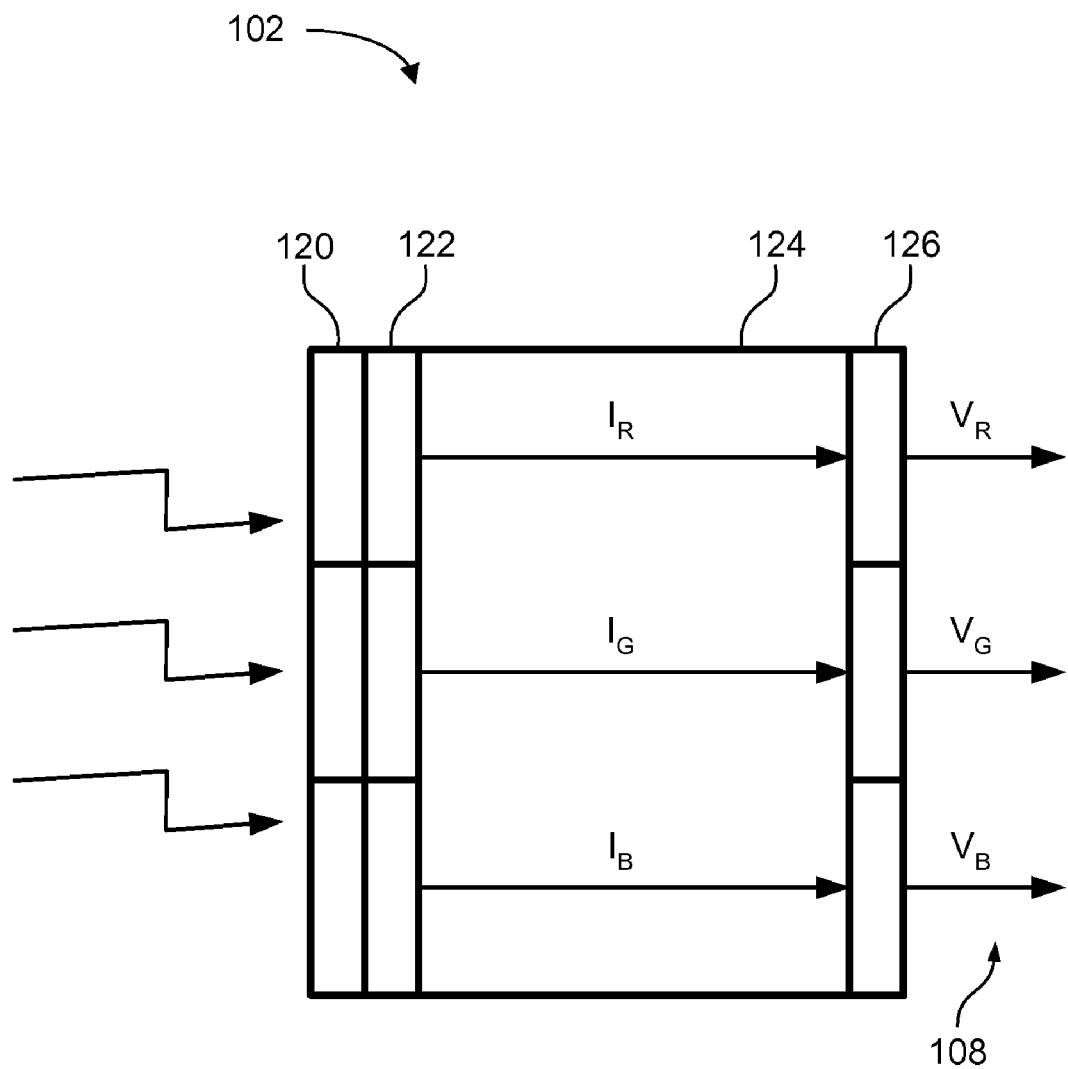
FIG. 3 depicts a schematic diagram of one embodiment of an RGB color sensor for use in the ALS system of FIG. 2.

FIG. 3 depicts a schematic diagram of one embodiment of an RGB color sensor 102 for use in the ALS system 100 of FIG. 2. As described above, the RGB color sensor 102 is one example of a light-to-analog voltage color sensor. The depicted RGB color sensor 102 includes multiple color filters 120, photodiodes 122, channel circuitry 124, and current-to-voltage converters 126.

In one embodiment, the color filters 120 include one filter for each color channel. For example, the RGB color sensor 102 may include one red color filter 120, one green color filter 120, and one blue color filter 120. Other embodiments use a different number of filters for each color channel. Each color filter 120 is aligned with one or more corresponding photodiodes 122. The photodiodes 122 convert the incident light to an electrical current, which is transmitted by the channel circuitry 124 to the corresponding current-to-voltage converters 126. As an example, the RGB color sensor 102 includes a red current-to-voltage converter 126; a blue current-to-voltage converter 126; and a green current-to-voltage converter 126. The red, blue, and green current-to-voltage converters 126 convert corresponding electrical currents, I, to electrical voltages, V.

Figure 4:
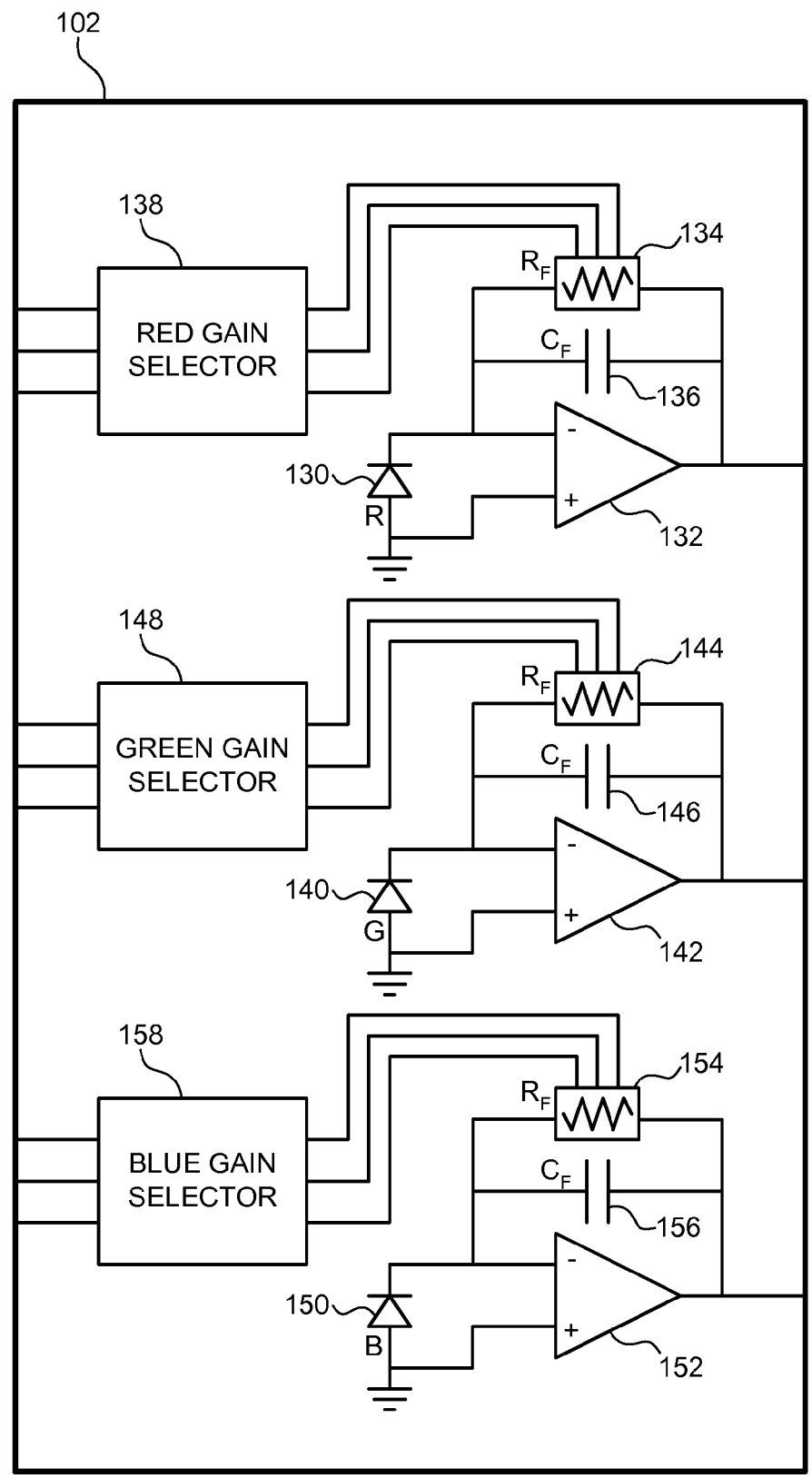
FIG. 4 depicts a schematic diagram of another embodiment of an RGB color sensor for use in the ALS system of FIG. 2.

FIG. 4 depicts a schematic diagram of another embodiment of an RGB color sensor 102 for use in the ALS system 100 of FIG. 2. The depicted RGB color sensor 102 includes three color channels. Each color channel includes circuitry to produce an amplified voltage signal corresponding to a photocurrent produced by a filtered photodiode. In particular, the red color channel includes a red-filtered photodiode 130. The photocurrent produced by the red-filtered photodiode 130 is sent to a transimpedance amplifier 132. A feedback resistor 134 and a feedback capacitor 136 are coupled in parallel in a feedback loop for the transimpedance amplifier 132. In one embodiment, the feedback resistor 134 is programmable by a red gain selector 138 to influence the gain of the transimpedance amplifier 132. The settings of the red gain selector 138 may be controlled, for example, by three digital input lines, although other embodiments may use fewer or more control inputs.

Each of the green and blue color channels is substantially similar to the red color channel. In other words, the green color channel includes a green-filtered photodiode 140, a transimpedance amplifier 142, a feedback resistor 144, a feedback capacitor 146, and a green gain selector 148. Similarly, the blue color channel includes a blue-filtered photodiode 150, a transimpedance amplifier 152, a feedback resistor 154, a feedback capacitor 156, and a blue gain selector 158. Other components of the RGB color sensor 102 are omitted from the figure for clarity, but may be included in various embodiments. In this way, the RBG color sensor 102 outputs red, green, and blue analog voltage signals.

In one embodiment, the RGB color sensor 102 is implemented in an integrated circuit (IC). In another embodiment, the RGB color sensor 102 is implemented in a printed circuit board (PCB). Alternatively, some of the components of the RGB color sensor 102 may be external to an IC or a PCB. In some embodiments, some or all of the components described herein may be replaced with other components which operate in a similar manner and/or achieve a similar result. For example, the RGB color sensor 102 may include phototransistors instead of photodiodes.

Furthermore, other embodiments of the polychromatic color sensor 102 may include the ADC 104 described above so that the outputs of the polychromatic color sensor 102 are digital voltage signals. In some embodiments, the digital processor 106 also may be implemented with the polychromatic color sensor 102 so that the functionality of the ALS system 100 may be implemented in a single chip or integrated circuit (IC).

Figure 5A:
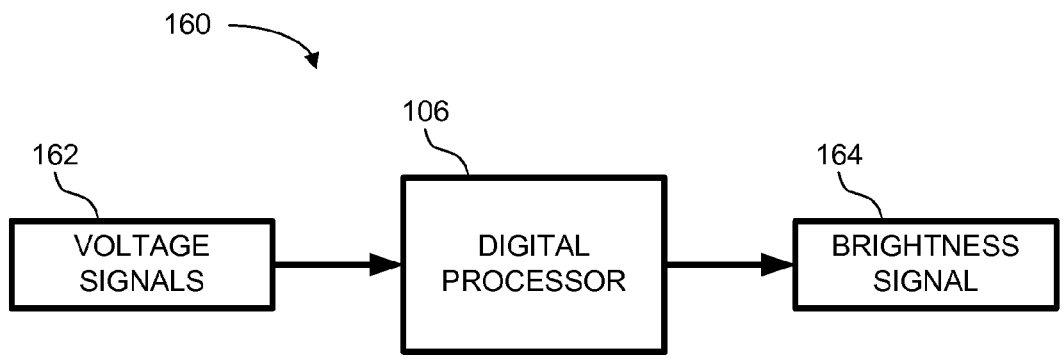
FIG. 5A depicts a schematic diagram of one embodiment of a conversion process for the digital processor to convert voltage signals from the RGB color sensor to a brightness signal.

FIG. 5A depicts a schematic diagram of one embodiment of a conversion process 160 for the digital processor 106 to convert voltage signals 162 from the RGB color sensor 102 to a brightness signal 164. In measuring ambient brightness, the RGB color sensor 102 can be designed to have a response that mimics the human photopic response curve. One way to generate the brightness signal 164 (i.e., an electrical signal which represents a brightness value within the ALS system 100) is to select one of the analog voltage signals 162 as the brightness signal. Since the analog voltage signal for the green color channel typically approximates the human photopic response, the digital processor 106 may select the green analog voltage signal, $A_G$, 162 to be used as the brightness signal 164. Thus, the following equation can be written to describe the brightness, B, of the ambient light signal:

$$B = A_G$$

In other embodiments, the brightness signal may depend, at least in part, on one of the other analog voltage signals 162 in addition to or instead of the green analog voltage signal 162.

Figure 5B:
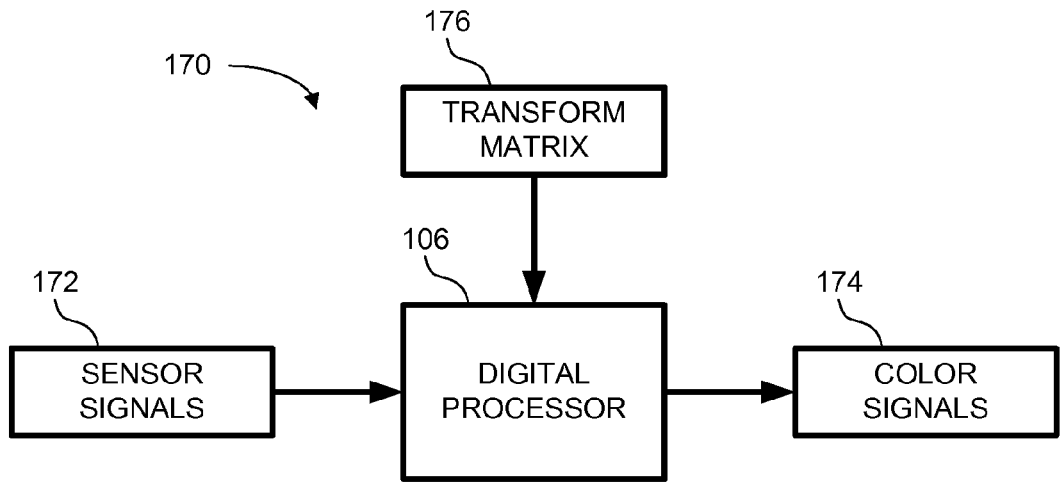
FIG. 5B depicts a schematic diagram of one embodiment of a conversion process for the digital processor to convert sensor signals from the RGB color sensor to color signals.

FIG. 5B depicts a schematic diagram of one embodiment of a conversion process 170 for the digital processor 106 to convert sensor signals 172 from the RGB color sensor 102 to color signals 174. In one embodiment, the color sensor responses are mapped to the International Commission on Illumination (usually known as "CIE" for the French name Commission internationale de l'éclairage) XYZ color space. The color sensor responses may be mapped to the CIE XYZ color space using a transform matrix 176 such as a linear, nonlinear, polynomial, or other transform. The type of transform matrix 176 used may depend, at least in part, on the number of color channels represented in the polychromatic color sensor 102. For example, the following equation calculates the XYZ response for a three-channel color sensor 102 based on the analog sensor voltages, $A_R$, $A_G$, and $A_B$:

$$\begin{bmatrix} X \\ Y \\ Z \end{bmatrix} = T \cdot \begin{bmatrix} A_R \\ A_G \\ A_B \end{bmatrix},$$

where $$T = \begin{bmatrix} C_{00} & C_{01} & C_{11} \\ C_{10} & C_{11} & C_{12} \\ C_{20} & C_{21} & C_{22} \end{bmatrix}$$

The reference coefficients $C_{00}$-$C_{22}$ may be determined using a known set of reference colors. Alternatively, other transform matrices 176 may be derived and used, as are known in the art. Additional information regarding transform matrices, in general, can be found in G. Wyszecki and W. S. Stiles, *Color Science: Concepts and Methods, Quantitative Data and Formulae,* 2nd ed., (Wiley, N.Y., 2000). Also, although the equation shown uses the analog voltage signals, other embodiments may use the digital sensor voltages, $D_R$, $D_G$, and $D_B$, to calculate the CIE XYZ color signals 174.

Figure 5C:
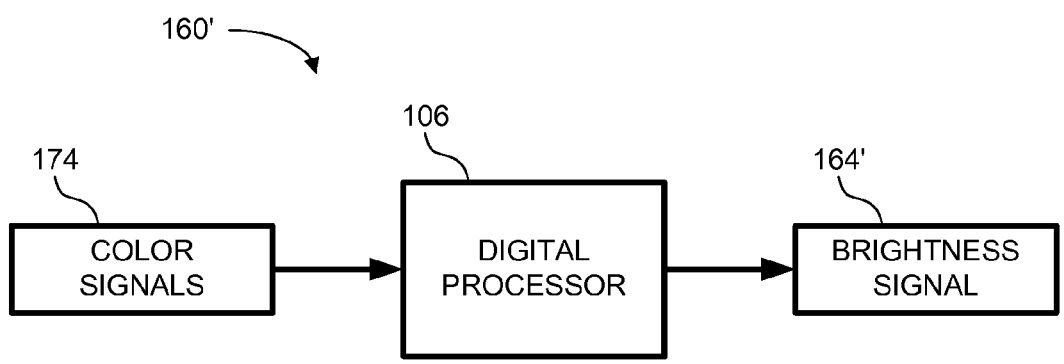
FIG. 5C depicts a schematic diagram of one embodiment of a conversion process for the digital processor to convert the color signals to a brightness signal.

FIG. 5C depicts a schematic diagram of one embodiment of a conversion process 160' for the digital processor 106 to convert the color signals 174 to a brightness signal 164'. After the sensor signals 172 (in either analog or digital form) have been converted to the color signals 174, for example, in the CIE XYZ color space, it turns out that the Y component of the color signals 174 correlates with the human photopic response curve. Hence, the Y component of the color signals 174 may be used to approximate the brightness value of the ambient light signal. In some embodiments, a four-channel color sensor is employed so that the digital processor 106 can generate the color signals 174 having four channels, which can be used to approximate the human photopic response curve. Additional information regarding a four-channel color sensor, in general, can be found in G. Wyszecki and W. S. Stiles, *Color Science: Concepts and Methods, Quantitative Data and Formulae,* 2nd ed., (Wiley, N.Y., 2000). The mapping for a four-channel color sensor is substantially similar to the mapping shown by the equation above, except that the transform matrix 176 becomes a 3×4 matrix and multiplies a vector with four sensor signals 172.

Figure 5D:
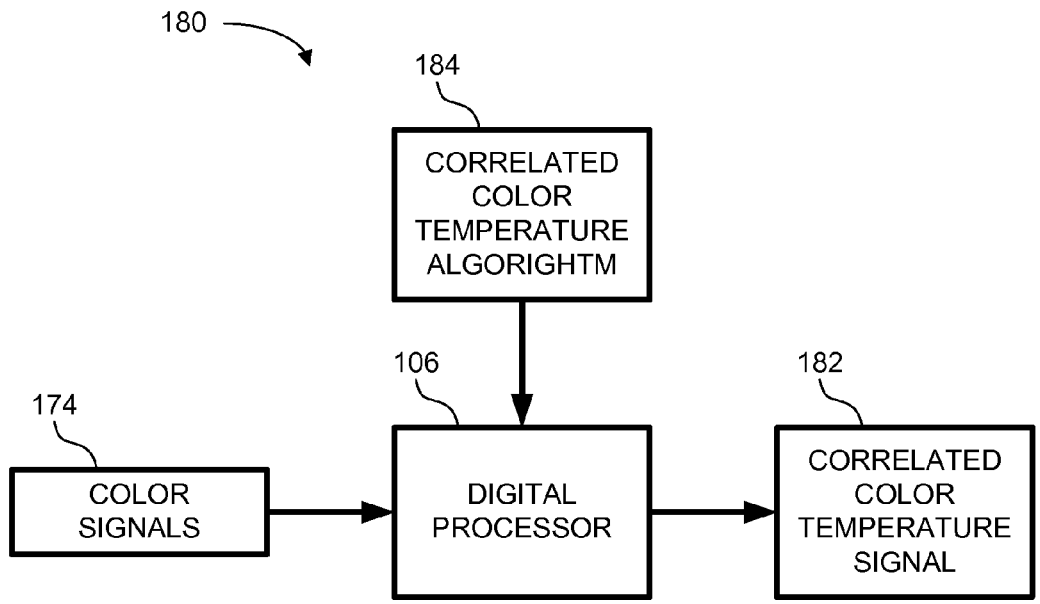
FIG. 5D depicts a schematic diagram of one embodiment of a conversion process for the digital processor to convert the color signals to a correlated color temperature signal.

FIG. 5D depicts a schematic diagram of one embodiment of a conversion process 180 for the digital processor 106 to convert the color signals 174 to a correlated color temperature signal 182. Correlated color temperature refers to an assigned color temperature of a light source 12 in an attempt to describe the perceived color of the light signal. In one embodiment, the correlated color temperature is calculated according to a correlated color temperature algorithm 184 stored in, for example, a memory device such as random access memory (RAM) coupled to the digital processor 106. Alternatively, the correlated color temperature algorithm 184 may be stored in another type of memory or storage device. In order to determine the correlated color temperature of the detected light signal, it may be useful to first convert the XYZ color signals 174 to CIE xy parameters, in which:

$$x = \frac{X}{X + Y + Z},$$

and $$y = \frac{Y}{X + Y + Z}$$

The CIE xy parameters may be used to calculate the correlated color temperature of the ambient light signal according to a variety of known formulas. One formula which is used is given by the equation that follows:

$$T_C = A_0 + A_1 e^{\frac{-n}{t_1}} + A_2 e^{\frac{-n}{t_2}} + A_3 e^{\frac{-n}{t_3}},$$

where $$n = \frac{x - x_e}{y - y_e}$$

Additional information regarding calculating the correlated color temperature, in general, can be found in J. Hernandez-Andres, R. Lee, and J. Romero, "Calculating Correlated Color Temperatures Across the Entire Gamut," Applied Optics, Vol. 38 No. 27 (Optical Society of America, 2000). A table of the coefficients is given as follows:

| For CCT ≤ 50,000 | For CCT > 50,000 |
|---|---|
| $x_e$ = 0.3366 | $x_e$ = 0.3356 |
| $y_e$ = 0.1735 | $y_e$ = 0.1691 |
| $A_0$ = −949.86315 | $A_0$ = 36284.48953 |
| $A_1$ = 6253.80338 | $A_1$ = 0.00228 |
| $A_2$ = 28.3059 | $A_2$ = 5.4535 × $10^{-36}$ |

-continued

| For CCT ≤ 50,000 | For CCT > 50,000 |
|---|---|
| $A_3 = 0.00004$ | $A_3 = 0$ |
| $t_1 = 0.92159$ | $t_1 = 0.07861$ |
| $t_2 = 0.20039$ | $t_2 = 0.01543$ |
| $t_3 = 0.07125$ | $t_3 = 0.07125$ |

In using the correlated color temperature equation shown above, the first set of coefficients in the table is used initially. If the result is greater than 50,000, then the equation is recalculated using the second set of coefficients in the table. This enables the determination of color temperature or correlated color temperature from a color point.

Figure 5E:
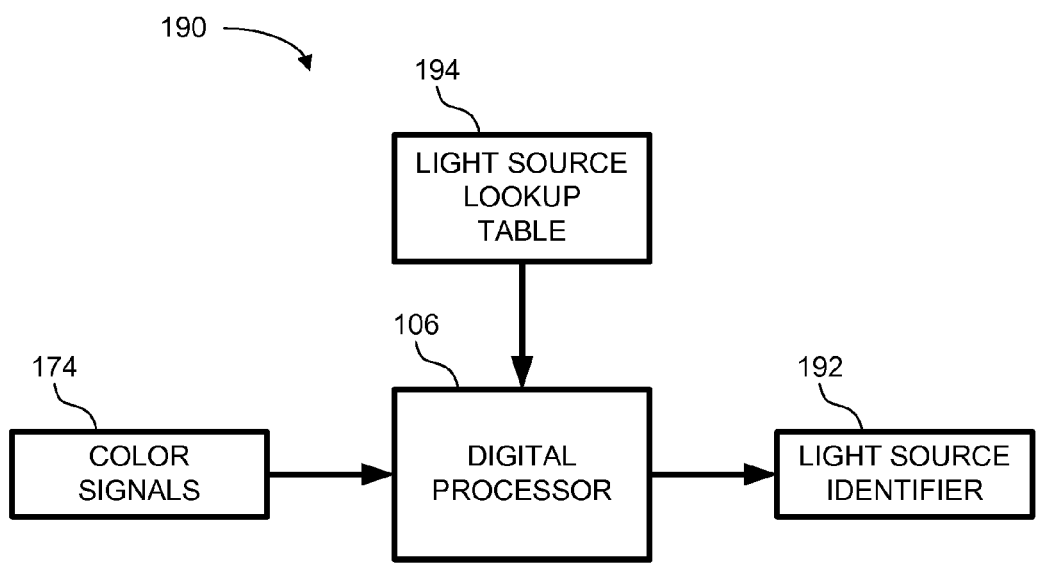
FIG. 5E depicts a schematic diagram of one embodiment of a conversion process for the digital processor to convert the color signals to a light source identifier.

FIG. 5E depicts a schematic diagram of one embodiment of a conversion process 190 for the digital processor 106 to convert the color signals 174 to a light source identifier 192. One implementation of the conversion process 190 utilizes a light source lookup table 194. In one embodiment, the light source lookup table 194 is stored in, for example, a memory device such as RAM coupled to the digital processor 106. Alternatively, the light source lookup table 194 may be stored in another type of memory or storage device. Using the lookup table 194, the measured ambient color (represented by the color signals 174) can be matched to a particular type of standard light source. There are many standard light sources in existence today. Many light sources are used for residential and office lighting. Each type of light source typically has a unique color, so the lookup table 194 may be used to determine a light source identifier 192 from the color signals 174. An example of the lookup table 194 is show below:

| Source | x | Y |
|---|---|---|
| F1 | 0.313 | 0.337 |
| F2 | 0.372 | 0.375 |
| F3 | 0.409 | 0.394 |
| F4 | 0.440 | 0.403 |
| F5 | 0.314 | 0.345 |
| F6 | 0.378 | 0.388 |
| F7 | 0.313 | 0.329 |
| F8 | 0.346 | 0.356 |
| F9 | 0.374 | 0.373 |
| F10 | 0.346 | 0.359 |
| F11 | 0.38 | 0.377 |
| F12 | 0.437 | 0.404 |
| D50 | 0.346 | 0.359 |
| D65 | 0.313 | 0.329 |
| A | 0.447 | 0.408 |

Other embodiments of the lookup table may include fewer or more types of lights sources. The designations used to identify the different types of light sources are standard and known in the art. For example, the designation F2 indicates a standard fluorescent light for use in applications such as offices. Thus, the digital processor 106 may identify each type of standard light source based on the CIE xy parameters derived from the color signals 174 of the received light signal.

Figure 6:
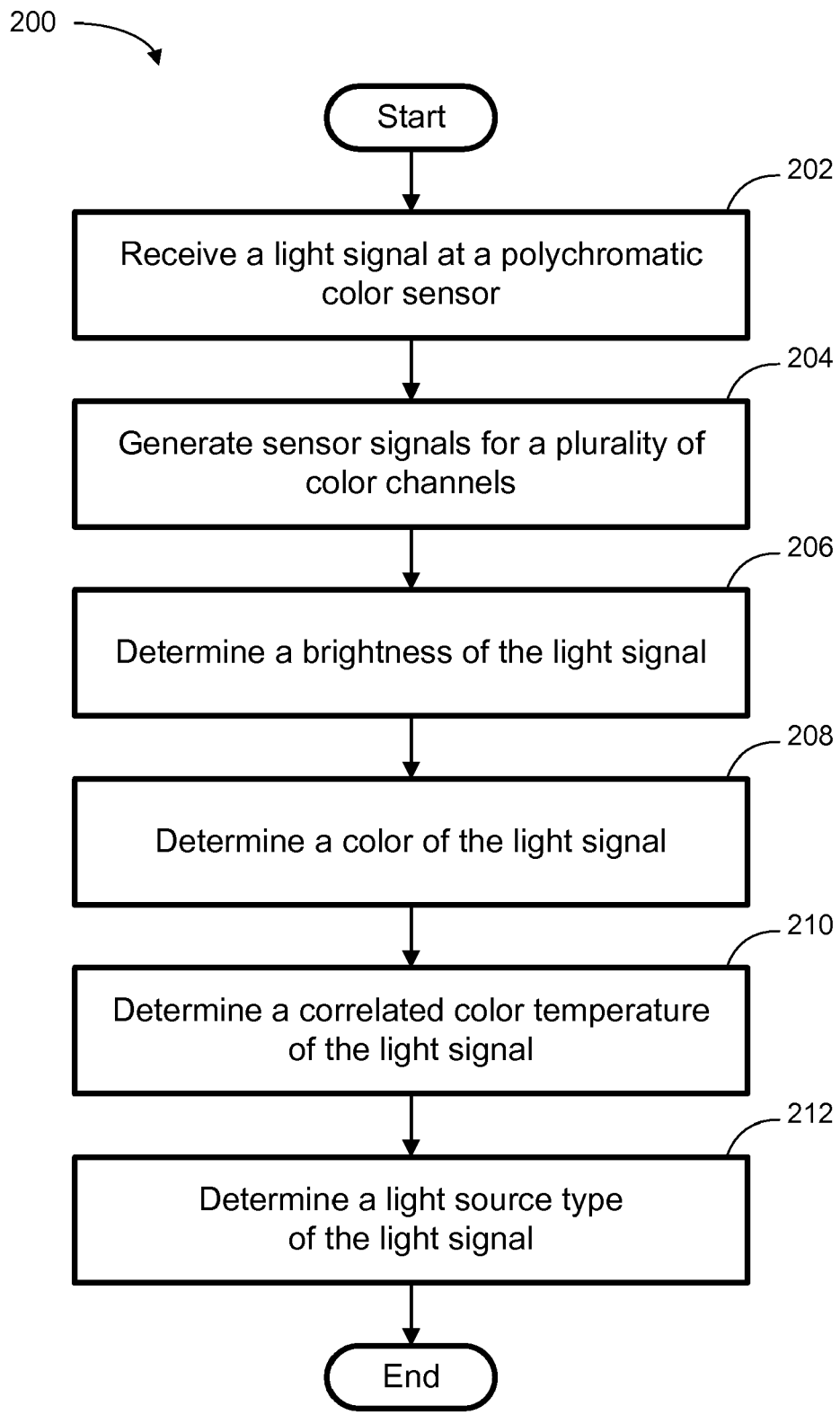
FIG. 6 depicts a schematic diagram of one embodiment of a method for operation of the ALS system of FIG. 2.

FIG. 6 depicts a schematic diagram of one embodiment of a method 200 for operation of the ALS system 100 of FIG. 2. As an example, the method 200 may be implemented in conjunction with the ALS system 100 of FIG. 2, although the depicted method 200 or a similar method also may be implemented with other ALS systems.

At block 202, the ALS system 100 receives a light signal. In particular, the polychromatic color sensor 102 of the ALS system 100 detects the light signal either directly or indirectly from a light source 12. At block 204, the polychromatic color sensor 102 generates a sensor signals corresponding to various color channels of the polychromatic color sensor 102. For example, the polychromatic color sensor 102 may generate analog voltage signals. In another embodiment, the sensor signals may be digital sensor signals generated, for example, by the ADC 104.

At block 206, the digital processor 106 determines a brightness of the light signal. In one embodiment, the brightness signal is derived from the analog voltage signals, as described above. Alternatively, the brightness signal may be derived from the digital voltage signals. In another embodiment, the brightness signals may be derived from the CIE XYZ color signals. At block 208, the digital processor 106 determines a color of the light signal. In one embodiment, the color signal is derived from the analog and/or digital voltage signals, as described above. At block 210, the digital processor 106 determines a correlated color temperature of the light signal. In one embodiment, the correlated color temperature signal is derived from the color signals, as described above. At block 212, the digital processor 106 determines a light source type of the light signal. In one embodiment, the light source identifier is derived from the color signals, as described above. The depicted method 200 then ends.

Figure 7:
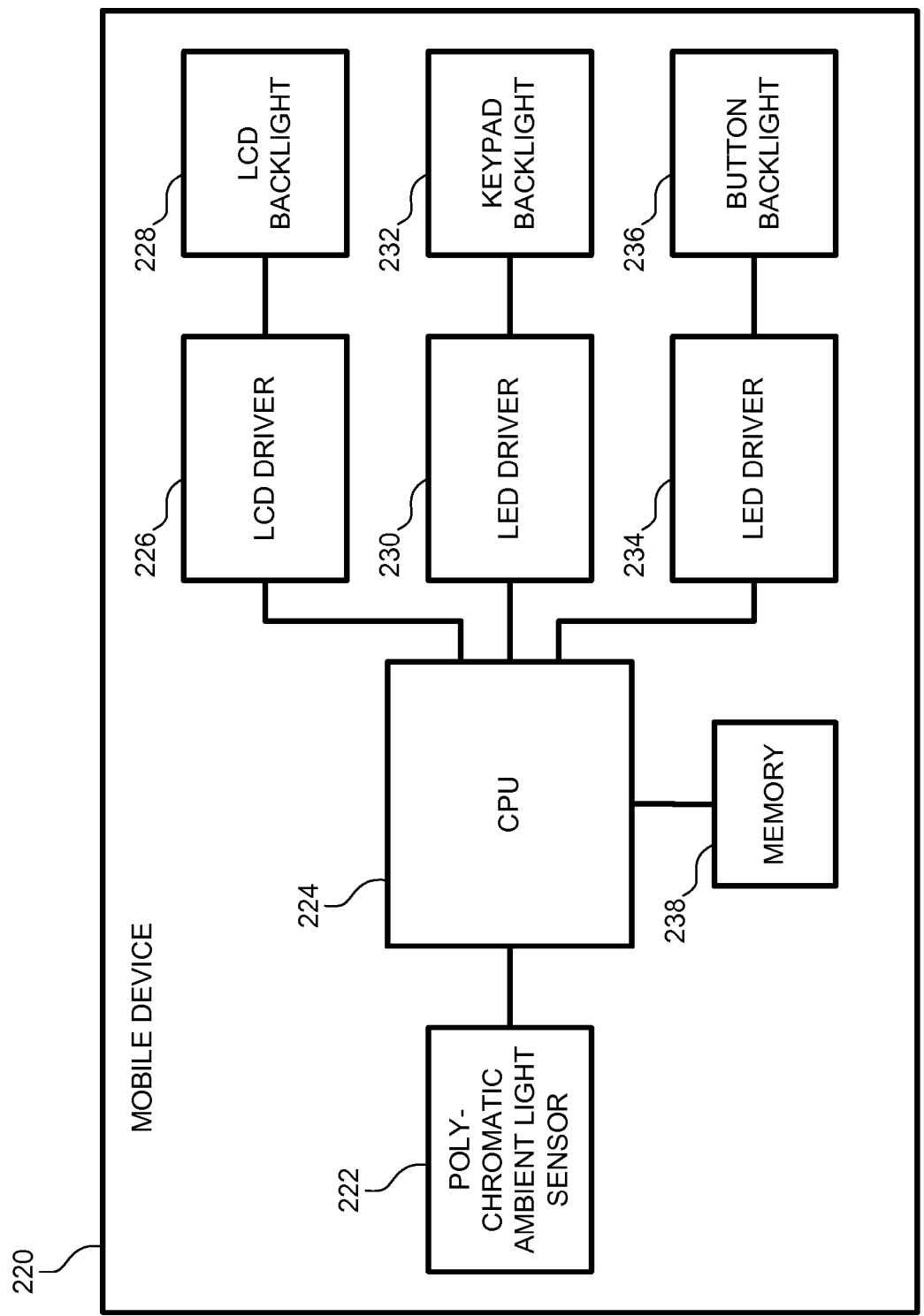
FIG. 7 depicts a schematic diagram of one embodiment of a mobile device which uses a polychromatic light sensor to control one or more backlighting functions.

FIG. 7 depicts a schematic diagram of one embodiment of a mobile device 220 which uses a polychromatic ambient light sensor 222 to control one or more backlighting functions. The depicted mobile device 220 includes the polychromatic ambient light sensor 222, a central processing unit 224, and multiple lighting subsystems. In particular, the depicted mobile device 220 includes a liquid crystal display (LCD) driver 226 for an LCD backlight 228, a light emitting diode (LED) driver 230 for a keypad backlight 232, and a LED driver 234 for a button backlight 236. The depicted mobile device 220 also includes a memory device 238. Other components (e.g., transceivers, codecs, etc.) of the mobile device 220 are not shown, but may be included in some embodiments to provide functions as are known in the art.

In one embodiment, the polychromatic ambient light sensor 222 detects ambient light at the mobile device 220. The CPU 224 then processes the detected ambient light signal according to one or more algorithms or other processing techniques to control one or more of the backlights 228, 232, and 236 via the corresponding driver. For example, the CPU 224 may increase button brightness in response to increased ambient brightness. As another example, the CPU 224 may shift the color tint of the LCD based on the correlated color temperature of the ambient light source. Additionally, the CPU 224 may implement other changes to one or more of the components of the mobile device 220 in response to a determined characteristic of the ambient light detected by the polychromatic ambient light sensor 222.

Embodiments of the ALS system 100 described above may be implemented in various types of ambient lighting applications. Among these many applications, backlighting applications (e.g., keyboard or button backlighting, or screen backlighting) may benefit from embodiments of the ALS system 100. Some embodiments may be implemented in mobile devices such as a mobile (e.g., cellular) telephone or a personal digital assistant (PDA). Some embodiments may be implemented in other types of computing devices such as electronic notebooks. Some embodiments may be implemented in consumer devices such as televisions, video cameras, digital still cameras, and other consumer devices. Additionally, some embodiments may be implemented in residential or commercial lighting management systems, electronic signs or signals, or other lighting or control applications.

Embodiments of the ALS system 100 provide a more comprehensive characterization of the ambient light, and facilitate control of a device based on the characterization of the ambient light.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. An ambient light sensor (ALS) system comprising:
    a polychromatic color sensor to generate a plurality of analog signals from a corresponding plurality of color channels based on a detected ambient light signal;
    an analog-to-digital converter (ADC) coupled to the polychromatic color sensor, the analog-to-digital converter to convert the plurality of analog signals to a plurality of digital signals;
    a digital processor coupled to the analog-to-digital converter, the digital processor to generate a processed light signal according to a mapping of individual color responses to a standard color space, wherein the processed light signal describes a characteristic of the detected ambient light signal; and
    a memory device coupled to the digital processor, the memory device to store a correlated color temperature algorithm, wherein the digital processor is further configured to generate the processed light signal according to the correlated color temperature algorithm stored in the memory device.

2. The ambient light sensor system of claim 1 wherein the processed light signal comprises a color signal to describe a color characteristic of the detected ambient light signal.

3. The ambient light sensor system of claim 2 wherein the digital processor is configured to apply a transform matrix to the plurality of digital signals to generate the color signal.

4. The ambient light sensor system of claim 2 wherein the processed light signal comprises a brightness signal to describe a brightness characteristic of the detected ambient light signal, wherein the brightness signal is derived from a component of the color signal.

5. The ambient light sensor system of claim 4 wherein the digital processor is configured to select one of the plurality of digital signals to generate the brightness signal.

6. The ambient light sensor system of claim 2 wherein the processed light signal comprises a correlated color temperature signal to describe a correlated color temperature characteristic of the detected ambient light signal, wherein the correlated color temperature signal is derived from the color signal.

7. The ambient light sensor system of claim 6 wherein the digital processor is configured to apply a correlated color temperature algorithm to the plurality of digital signals to generate the correlated color temperature signal.

8. The ambient light sensor system of claim 2 wherein the processed light signal comprises a light source identifier to indicate a light source type of the detected ambient light signal, wherein the light source identifier is derived from the color signal.

9. The ambient light sensor system of claim 8 further comprising a memory coupled to the digital processor, the memory configured to store a lookup table, wherein the digital processor is configured to reference the lookup table in the memory to determine the light source identifier.

10. The ambient light sensor system of claim 1 wherein the polychromatic color sensor comprises a light-to-analog color sensor configured to detect a plurality of colors and to generate the plurality of analog signals, each of the plurality of analog signals associated with a corresponding one of the plurality of colors, wherein the plurality of color channels comprises red, green, and blue (RGB) color channels.

11. The ambient light sensor system of claim 1 wherein the polychromatic color sensor comprises a four-band color sensor.

12. The ambient light sensor system of claim 1 further comprising a backlight coupled to the digital processor, wherein the digital processor is configured to modify an operation of the backlight in response to generation of the processed light signal.

13. An apparatus to monitor ambient light, the apparatus comprising:
    means for receiving a light signal from an ambient light source;
    means for mapping individual color responses to a standard color space to generate a plurality of sensor signals from the received light signal, wherein the plurality of sensor signals corresponds to a plurality of color channels;
    means for storing a correlated color temperature algorithm; and
    means for generating a processed light signal according to the correlated color temperature algorithm, wherein the processed light signal describes a characteristic of the received light signal.

14. The apparatus of claim 13 wherein the processed light signal is indicative of a characteristic other than brightness of the received light signal.

15. The apparatus of claim 14 wherein the means for generating the processed light signal comprises means for determining a color of the received light signal.

16. The apparatus of claim 14 wherein the means for generating the processed light signal comprises means for determining a correlated color temperature of the received light signal.

17. The apparatus of claim 14 wherein the means for generating the processed light signal comprises means for determining a light source type of the ambient light source.

18. A method for sensing ambient light conditions, the method comprising:
    storing a correlated color temperature algorithm;
    receiving a light signal from an ambient light source;
    mapping individual color responses of the received light signal to a standard color space to generate a plurality of sensor signals based on the received light signal, wherein each of the plurality of sensor signals is associated with a corresponding one of a plurality of color channels; and
    generating a processed light signal according to the correlated color temperature algorithm based on at least one of the sensor signals, wherein the processed light signal describes a characteristic of the received light signal.

19. The method of claim 18 further comprising controlling a backlight of a mobile device based on the processed light signal, wherein the processed light signal comprises a correlated color temperature signal.

20. The method of claim 18 wherein receiving the light signal from the ambient light source comprises receiving light reflected off of an illuminated object which is illuminated by an incident light signal from the ambient light source.

* * * * *